Patented Dec. 17, 1940

2,225,564

UNITED STATES PATENT OFFICE 2,225,564

PREPARATION OF PARACRESOL

John W. Le Maistre, Hal H. Strickland, Jr., and Joe C. Weaver, Jr., Birmingham, Ala., assignors to Theodore Swann, Birmingham, Ala.

No Drawing. Application August 15, 1938, Serial No. 224,970

6 Claims. (Cl. 260—628)

This invention relates to the preparation of paracresol, and has for an object the provision of a process which shall be effective to produce the maximum of paracresol with a minimum of ortho- and meta-cresol.

A still further object of the invention is to provide a process for preparing paracresol, which shall be simple and economical and which shall provide the maximum yields with a minimum of waste products.

A still further object of our invention is to provide an improved caustic fusion step in the preparation of paracresol which shall include control features whereby the caustic fusion may be carried out more economically than heretofore deemed possible in the art, and with a more complete conversion to alkali cresolate.

A still further object of our invention is to provide, in a process of producing paracresol, a sulfonation step which shall be effective to produce toluene sulfonic acid which shall be high in the para isomer content.

In the preparation of paracresol according to our improved process, we first sulfonate toluene to toluene sulfonic acid. We have found in this step of our process that the maximum production of the p-isomer is obtained if strong sulfuric acid (around 66° Bé.) be employed and maintained at a temperature of from 130° to 135° C. during sulfonation. The toluene is vaporized and passed through the hot sulfuric acid in vapor form. The unreacted toluene and water formed by the reaction are collected and the toluene revaporized and passed through the acid. By this means we are able to produce a product containing 85% or more of para-toluene-sulfonic acid. The product, without separation, is then neutralized with caustic soda to form sodium toluene sulfonate.

It has heretofore been proposed to prepare paracresol by the alkali fusion of sodium toluene sulfonate to form alkali cresolate and then hydrolyzing by reacting with a mineral acid. The fusion has heretofore been difficult and it has been considered necessary to employ the more expensive potassium hydroxide or at least a mixture of caustic soda and potassium hydroxide in order to produce the alkali cresolate. For example, in "Organic Syntheses" by Gilman, (1932) vol. I, page 170, the generally accepted view that potassium hydroxide is essential is set forth.

We have discovered that if the temperature be confined between certain limits and carefully controlled, caustic soda alone may be used as the alkali fusion agent. If the temperature is allowed to fall much below 330° C., say to 310° C., the product becomes mushy and begins to foam and the reaction is very slow. If the temperature is maintained between 330° and 360° C., the reaction goes smoothly.

Following the caustic fusion step the sodium cresolate formed is hydrolyzed by reacting with a suitable acid, such as sulfuric, hydrochloric, or acetic acid, or by reacting with $SO_2$ or $CO_2$ to form cresol, of which the para isomer will constitute 70% or more, and the ortho isomer about 10%. Separation of the isomers may be made by distillation, or freezing, or by any other known means.

The following is a specific example of one way of carrying out our improved process:

About 430 pounds of 66° Bé. sulfuric acid are heated in a suitable vessel to a temperature of about 110° C. Toluene is vaporized in a separate boiler and the vapors are passed through the sulfuric acid at the rate of about 300 pounds per hour, being introduced into the sulfuric acid by means of a gas distributor beneath the surface of the acid. The product is stirred continually and the temperature is gradually increased until it reaches 130° to 135° C. and is preferably held at this temperature for the remainder of the run, and the temperature should not be allowed to rise above 145° C. If the temperature is allowed to remain below 130° C., the reaction is not only slower, but a considerable amount of ortho-toluene-sulfonic acid is formed. If the temperature is allowed to go above 145° C., an undue proportion of the meta isomer is formed.

The unreacted toluene vapors, together with the water formed in the reaction, are collected and condensed, the water separated, and the toluene re-vaporized and returned to the toluene boiler. When from 80 to 85 pounds of water have been collected, the operation may be stopped and the product cooled. The toluene sulfonic acid thus obtained weighs about 750 pounds, and if the temperature limitations set forth are observed, will be found to contain not more than 2% of unreacted sulfuric acid and from 2 to 10% of toluene. The sulfonation operation requires from 15 to 20 hours.

The 750 pounds of toluene sulfonic acid obtained as above described is diluted with about 150 pounds of water. To this solution is then slowly added, with stirring and cooling, a sufficient 50% caustic soda solution, calculated from the analysis of the toluene sulfonic acid, for complete neutralization of the acid. When the neutralization is complete, sufficient water is added to bring the concentration of the sodium toluene sulfonate thus formed to 60 to 70%. This reaction requires about 175 pounds of caustic soda and the solution thus obtained will be found to weigh from 1200 to 1400 pounds.

In a suitable kettle, there is now charged caustic soda in the proportion of 2.5 mols for each mol of sodium toluene sulfonate. For the solution obtained as above described, about 425 pounds of caustic soda are needed. The caustic soda is melted, and when it has reached a temperature from 330° to 340° C., the solution of sodium toluene sulfonate is slowly added thereto. The product should be well stirred and should be added at such a rate as will allow the maintenance of a temperature of 330° to 350°, preferably between 330° and 340° C. The addition of the 1200 to 1400 pounds of solution obtained as before described, will require from 6 to 10 hours, if the critical range of temperatures herein set forth are observed. If the temperature is allowed to fall too low during this operation, say down to 310° C., the product becomes mushy, rather than liquid, and foams so badly that it is difficult to retain it in the fusing kettle. Also, the reaction proceeds very slowly, and such yields of sodium cresolate as are obtained are too low to be satisfactory from a commercial standpoint.

When the sodium toluene sulfonate has all been added, the temperature of the mix is allowed to rise to 350° to 360° C., and is held in this range with continued stirring for about three hours. If the temperature is allowed to rise much above 360°, say to 370° C., undesired side reactions take place and heavy tars are formed. When the reaction is complete, the heating means are turned off and sufficient water is run into the hot mix to quench and dissolve it. This will require about 70 gallons of water. The steam formed during the quenching is vented during the quenching operation. After the mixture is quenched, the solution of sodium cresolate thus formed will amount to about 140 gallons. It is allowed to cool to a temperature of 30° to 35° C. and enough water is added with stirring to bring the specific gravity of the solution to around 1.25. The sodium sulphite formed during the reaction will have crystallized out of the solution and may be separated by a centrifuge.

To the sodium cresolate liquor is now added sufficient acid, as hereinbefore set forth, to liberate the cresol. If sulfuric acid is employed, it will be found to require from 450 to 500 pounds of 60° Bé. acid to hydrolyze the batch of sodium cresolate under consideration and release the cresol. The acid should be added through a pipe running beneath the surface of the liquor and the temperature should be kept at 30° to 80° C. by external cooling while the reaction is going on. When the liquor becomes faintly acid to litmus paper, the addition of acid is stopped and the solution is allowed to stand until the cresol has separated from the aqueous layer. The aqueous layer is then drained and enough soda ash is added to the crude cresol to remove traces of free acid and make the product faintly alkaline to litmus paper.

It will be found that about 450 pounds of crude cresol will thus be obtained. The crude cresol will be found to contain about 10% water, 10% ortho-cresol, 70% paracresol, 30% meta-cresol, and about 7% tar. Fluctuations in operating conditions will, as a matter of course, vary these percentages.

The crude cresol may now be distilled in a fractionating column at from 30 to 40 mm. pressures. Besides the water and tar, there will be obtained from 50 to 60 pounds of ortho-cresol and from 300 to 310 pounds of a fraction containing 94 to 96% paracresol, with the remainder the meta-cresol present in the crude product. The intermediate fraction is returned to the next distillation. If desired, the meta-cresol may be separated from the paracresol by freezing, as is well understood.

While we have shown our invention in but one form, it will be obvious to those skilled in the art that it is not so limited, but is susceptible of various changes and modifications, without departing from the spirit thereof, and we desire, therefore, that only such limitations shall be placed thereupon as are imposed by the prior art or as are specifically set forth in the appended claims.

What we claim is:

1. A process for the preparation of paracresol which comprises sulfonating toluene to form toluene sulfonic acid containing principally the para isomer, neutralizing with caustic soda to form sodium para toluene sulfonate, fusing with caustic soda at a temperature from 330° to 360° C. to form sodium para cresolate, and hydrolyzing the sodium para cresolate to form paracresol.

2. A process for the preparation of paracresol from sodium toluene sulfonate containing a substantial proportion of the para isomer which comprises fusing the sodium toluene sulfonate with caustic soda at a temperature of from 330° to 360° C., hydrolyzing with sulfuric acid to form cresol, and distilling to obtain paracresol.

3. A process for the preparation of paracresol from sodium toluene sulfonate containing the para isomer which comprises fusing the sodium toluene sulfonate with approximately 2.5 mols of caustic soda for each mol of sodium toluene sulfonate, and at a temperature of from 330° to 360° C. until the sodium para toluene sulfonate has been converted to sodium para cresolate, quenching the melt by the addition of water in a sufficient amount to dissolve it, adding 60° Bé. sulfuric acid until the liquor becomes faintly acid, and distilling to separate the paracresol.

4. A process for the preparation of paracresol from sodium para toluene sulfonate which comprises fusing with caustic soda in the proportion of approximately 2.5 mols of caustic soda for each mol of sodium toluene sulfonate and at a temperature from 330° to 360° C. until the sodium para toluene sulfonate has been converted to sodium para cresolate, quenching the melt by adding water in sufficient amount to dissolve it and bring it to a specific gravity of around 1.25, separating the sodium sulfite formed, reacting the sodium cresolate with a mineral acid to liberate the paracresol, and separating the paracresol by distillation.

5. A process for the preparation of paracresol from sodium paratoluene sulfonate which comprises fusing a mixture of sodium toluene sulfonates containing the paraisomer with caustic soda in the proportion of approximately 2.5 mols of caustic soda for each mol of sodium toluene sulfonate and at a temperature from 330° to 360° C. until the sodium toluene sulfonate has been converted to sodium cresolate, quenching the melt by adding water in sufficient amount to dissolve it and bring it to a specific gravity of around 1.25, separating the sodium sulfite formed, reacting the sodium cresolate solution with 60° Bé. sulfuric acid while maintaining the temperature below 50° C. until the reaction mixture becomes faintly acid, and distilling to separate paracresol.

6. A process for the preparation of paracresol which comprises passing toluene vapors through sulfuric acid heated to a temperature of 130° to 135° C. to form toluene sulfonic acid containing the para isomer as the principal constituent, neutralizing the mix with caustic soda to form sodium toluene sulfonate, fusing with caustic soda at a temperature of 330° to 360° C. to form sodium cresolate, and reacting with acid to form cresol.

JOHN W. LE MAISTRE.
HAL H. STRICKLAND, Jr
JOE C. WEAVER, Jr.